United States Patent [19]

Walzer

[11] Patent Number: 4,870,819
[45] Date of Patent: Oct. 3, 1989

[54] CONTROL DEVICE FOR A HYDROSTATIC DRIVE FOR AT LEAST TWO ACTUATORS

[75] Inventor: Winfried Walzer, Elchingen, Fed. Rep. of Germany

[73] Assignee: Hydromatik GmbH, Fed. Rep. of Germany

[21] Appl. No.: 147,236

[22] Filed: Jan. 22, 1988

[30] Foreign Application Priority Data

Jan. 23, 1987 [DE] Fed. Rep. of Germany ....... 3702000

[51] Int. Cl.$^4$ ............................................. F16D 31/02
[52] U.S. Cl. ........................................ 60/422; 60/427; 60/445
[58] Field of Search ................ 60/426, 427, 442, 445, 60/450, 452, 422

[56] References Cited

U.S. PATENT DOCUMENTS

| 3,579,987 | 5/1971 | Busse | 60/426 X |
| 3,914,939 | 10/1975 | Purdy | 60/422 |
| 3,991,571 | 11/1976 | Johnson | 60/452 X |
| 4,137,716 | 2/1979 | Budzich | 60/452 X |

FOREIGN PATENT DOCUMENTS

| 65304 | 11/1982 | European Pat. Off. | 60/452 |
| 72073 | 6/1977 | Japan | 60/452 |

Primary Examiner—Robert E. Garrett
Assistant Examiner—Mark A. Williamson
Attorney, Agent, or Firm—Scully, Scott, Murphy & Presser

[57] ABSTRACT

A control device for a hydrostatic drive for at least two actuators, having a variable displacement pump whose adjusting device is acted on in accordance with the displacement and/or the flow pressure, wherein each actuator has associated with it, in its hydraulic supply line, a control valve and a preceding displacement controller in the form of a pressure compensator, is simplified while ensuring accurate control. This is achieved by associating with the control device an electronic regulating device which, depending on a measuring element that detects the opening position of the pressure compensator, controls, by means of an adjusting member associated with the adjusting device, the displacement setting of the pump, increasing it as the opening of the pressure compensator(s) becomes larger and decreasing as the opening becomes smaller.

4 Claims, 1 Drawing Sheet

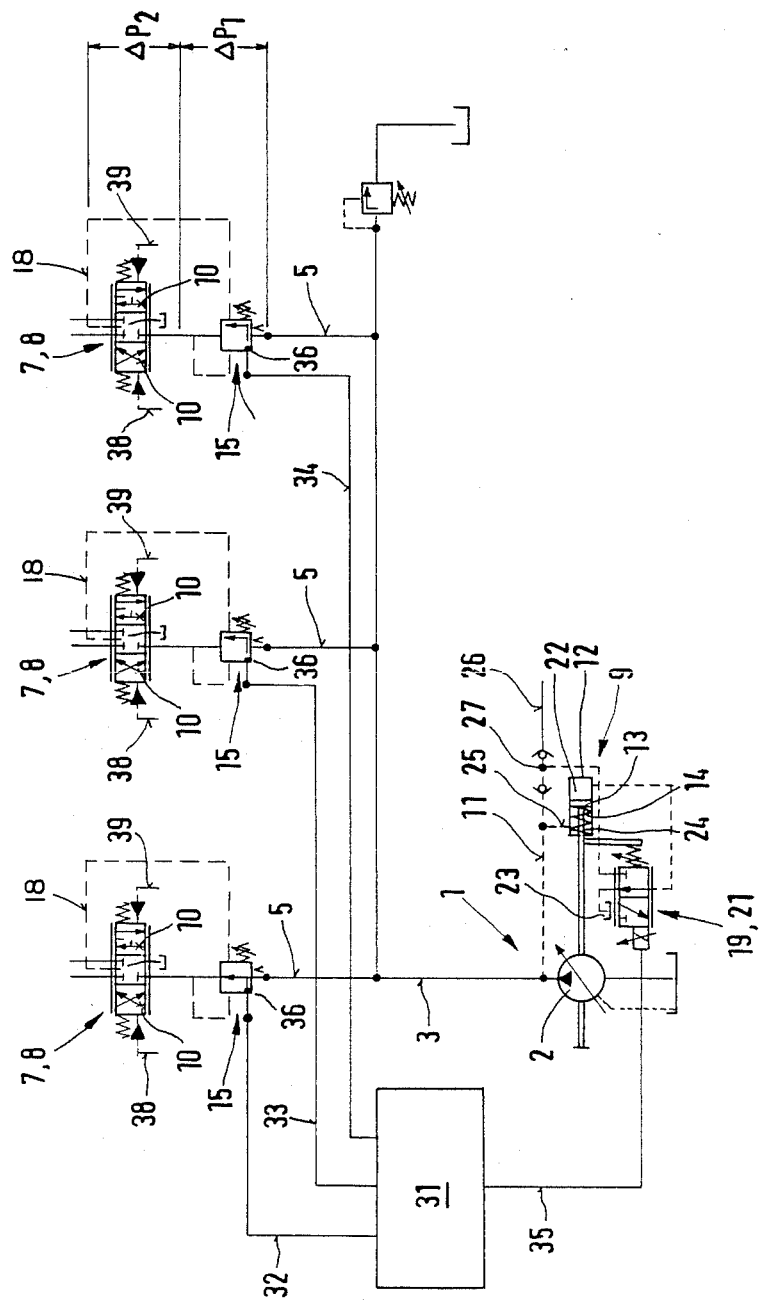

CONTROL DEVICE FOR A HYDROSTATIC DRIVE FOR AT LEAST TWO ACTUATORS

TECHNICAL FIELD OF THE INVENTION

The invention relates to a control device for a hydrostatic drive for at least two actuators

BACKGROUND OF THE INVENTION AND PRIOR ART

A control device of this kind is a so-called "load sensing" control in which the fraction of the delivery flow which reaches each actuator is determined by means of a delivery flow controller that is pressurized as a function of the opening area of the associated control valve. Thus the displacement setting of the pump is set in accordance with the actuator loads which are transmitted to the adjusting device of the pump by means of load pressure feed back lines.

The flow controller usually comprises so-called pressure compensators which perform the $\Delta P_2$ delivery flow regulation by ensuring a constant pressure difference of about 8 to 20 bar. With this "loadsensing" principle the displacement adjustment thus occurs with the above-mentioned pressure difference from the load pressures, which can result in oscillation problems.

OBJECT OF THE INVENTION

The object of the invention is to simplify a control device of the kind mentioned above and still ensure accurate control.

BRIEF DESCRIPTION OF THE INVENTION

This object is achieved by a control device for a hydrostatic drive for at least two actuators, comprising a variable displacement pump whose adjusting device can be acted on as a function of the displacement and/or of the flow pressure, wherein each actuator has associated with it, in its hydraulic supply line, a control valve and a preceding displacement controller in the form of a pressure compensator, wherein the controller is associated with an electronic regulating device which, depending on a measuring element that detects the opening position of the pressure compensator, controls, by means of an adjusting member associated with the adjusting device, the displacement setting of the pump, increasing it as the opening of at least one of the pressure compensators becomes larger and decreasing it as the opening becomes smaller.

In the arrangement according to the invention the displacement setting is electronically controlled as a function of the automatically regulated pressure compensator or compensators. Not only are hydraulic feedback lines made unnecessary, but accurate or stable control, insensitive to oscillation, is also achieved, which is particularly suitable for applications where oscillations inevitably occur, as is particularly the case with vehicles and building machinery such as cranes, wheel loaders, bulldozer and excavators. Slight over- or undersupply to the actuator during the control process is consciously accepted.

The invention is based on the fact that the pressure compensator of the actuator with the greatest load is in a specific state, namely completely open, so long as the pump is producing too little pressure. If the pump delivers a higher pressure than is required by the actuator with the greatest load, the inlet pressure compensator is released from the fully open state and takes up an intermediate position. Under operating conditions where the actuator requirements remain the same, with the control device according to the invention the pump will always be regulated so that the displacement is increased as the opening becomes larger and is reduced as it becomes smaller.

Advantageous results have for example been obtained with the embodiment in which the measuring element comprises a limit switch. In this embodiment the pump is always controlled in such a way that at the limit stop and with contact of the limit switch (pressure compensator completely open) it is adjusted to give greater displacement, and in intermediate (partially open) positions of the pressure compensator give less displacement.

When there are several actuators, the pump is swung out or held swung out until all the pressure compensators have changed from their completely open end position to an intermediate position. After this the pump is swung back or held swung back until one of the pressure compensators returns to its completely open end position. This is the sign for the control system according to the invention that there is not enough pressure and that the pump should be readjusted for more displacement.

Advantageous results have however also obtained, for example, with the embodiment in which the measuring element comprises a position pickup.

Advantageous results also occur when the set point value for the control process corresponds to a specified position of a pressure compensator of the actuator with the highest load pressure.

Substantially improved control response is obtained by replacing the two-point control principle with a control principle which continuously registers the deviation of the pressure compenstor of the actuator with the greatest load pressure by means of a position pickup and supplies it to the pump proportionally, integrally and/or differentially via a controller. A suitable controller for this is an ordinary PID control.

In the embodiment wherein the set point value for the control process corresponds to a specified position of a pressure compensator of the actuator with the highest load pressure, it is also advantageous for the specified pressure compensator position to correspond to the widest possible opening of the pressure compensator (opened as wide as possible).

BRIEF DESCRIPTION OF THE DRAWING.

The invention will now be described in more detail with reference to a preferred exemplary embodiment shown in a simplified drawing.

The drawing shows a control device designed according to the invention for a hydrostatic driving gear for three actuators.

DETAILED DESCRIPTION OF THE INVENTION

Of the hydrostatic drive, generally denoted by 1 in the drawing, only the pump 2 and a part of the open circuit, namely the main line 3, are shown. For simplicity, the actuators are not shown. Associated with each actuator is a main line section 5 in which a control valve 7 in the form of a proportional directional control valve is installed. These are each 5/3 way directional control valves with a middle blocked position and lateral alternating positions for reversing the function of the hydraulic motor (actuator), should this be necessary. Located in the main line sections 5 are throttles 10, which are integrated in the control valves 7 in the present exemplary embodiment.

The pump 2 is one with variable displacement which can be set by an electro-hydraulic adjusting device 9 which is connected to the main line 3 of the pump 2 by a hydraulic line 11 and is thus adjustable by the feed pressure of the pump 2. The adjusting device 9 comprises a hydraulic cylinder 12 whose adjustment piston 13 is hydraulically adjustable against a spring 14, and engages the displacement setting member of the pump 2.

Arranged in each main line section 5 leading to the associated control valve 7 is a flow control valve in the form of a pressure compensator 15. The pressure compensator 15 is acted on by the feed pressure prevailing in the respective main line section 5 and, by reason of a connecting line 18, by the load pressure prevailing behind the control valve 7. At the pressure compensators, pressure drops $\Delta P_1$ of up to several hundred bar can occur, whilst at the measuring throttle 10 a constant $\Delta P_2$ of about 8 to 9 bar is maintained, due to the volume flow control. There is an exception to this since with an operational requirement of zero displacement the pressure compensator will carry out a micro-movement around the completely closed position.

Associated with the adjusting device 9 is a setting member, generally denoted by 19, which acts on the amount of the displacement in accordance with a pilot flow which is produced from the position of the pressure compensator. The setting member 19 comprises an electromagnetic proportional valve 21 which is arranged in the line 11 connecting the main line 3 to a working chamber 22 of the cylinder 12 and which controls the passage to this working chamber 22 or to a return flow 23. In the present exemplary embodiment the other working chamber 24 of the cylinder 12 can also be acted on by the load pressure via a line section 25. The spring 14 is arranged in the working chamber 24 which is formed by the piston ring chamber of the cylinder 12.

A control line 26 which transmits an auxiliary pressure can be connected to the line 11 and is safeguarded against the main line 3 on both sides of its connection point 27 by check valves.

The control device is associated with an electronic control device 31 which is connected via electric lines 32 to 34 to the pressure compensators. The electronic control device 31 is also connected to the setting member 19 or the proportional valve 21 via an electric line 35.

Each pressure compensator 15 has associated with it a limit switch 36 which is actuated when the pressure compensator 15 is completely open and is thus able to signal that the pressure compensator 15 is in the completely open position.

Instead of the limit switch 36 a position pickup in the form of a measuring element for recording any desired opening positions as well as intermediate positions of the pressure compensator 15 can be provided.

Numerals 38 and 39 indicate hydraulic or electric lines leading to the control valves 7, by means of which the control valves 7 can be adjusted or set at will for the purpose of pre-setting a selected volume flow for the respective actuator or for the actuators.

The functioning of the control device will now be described in more detail.

It is assumed that the pressure compensator 15 of the actuator with the greatest load occupies a specific state (completely open) as long as the pump 2 is producing too little pressure. If the pump 2 transmits a higher pressure than is required by the actuator with the greatest load the pressure compensator 15 will be released from its completely open state and will take up an intermediate position. These two considerations show that there is a connection between the position of the pressure compensator 15 of the actuator with the greatest load and the adjusting signal required at the pump 2, such that the pump 2 must give more pressure and more displacement (more swivel angle) until the pressure compensator 15 begins to respond and is released from its completely open position.

As soon as the pressure compensator 15 of the actuator with the greatest load is released from the completely open end position or from the limit stop, this means that the pressure produced at the pump 2 and the volume flow are sufficient for the requirements of the actuator. The pump 2 does not need to swing out further, but can be swung back a little until the pressure compenstor reaches its open state again.

In a stationary operational state with a constant actuator requirement the pump 2 would thus always be regulated in such a way that when the pressure compensator is positioned in its end position, namely at the limit switch 36 (pressure compensator completely open), it is controlled to give greater displacement, and at intermediate positions of the pressure compensator 15 it is controlled to give less displacement.

When there are several actuators the pump 2 would have to be swung out until all the pressure compensators have changed from their completely open end position to an intermediate position. The pump 2 can then be swung back until one of the pressure compensators 15 reaches its completely open end position again. This is the signal for the control system that there is not enough pressure and that the pump has to be set at greater displacement again, etc..

The clear connection described between the pump setting required and the state of the pressure compensator 15 can very simply be used, with the aid of the electronic logic circuit 31 (analog or digital), the limit switches 36 (preferably non-contact inductive or optical) and the setting member 19, for load sensing control.

A possible variation of the control system can take the form that an electronic circuit (logic circuit 31) resets the pump via a PID controller to the pressure compensator setting of the actuator which at that point in time has the greatest pressure load.

In the stationary state the pump has only to make a small differential adjustment movement, whereby the $\Delta P_1$ is essentially by-passed. Such an electronic control is very simple to carry out and can readily be effected by oscillation technology methods by the simple adjustment of the dynamic behavior of the control system that is then possible (electronic damping, should it be necessary). The advantages of electronic control are numerous:

Simple arrangement (hydraulic and electrical).

No LS-feed back (load pressure feed back) necessary (no LS line) as at the actuator with the highest volume flow requirement the pressure compensator is completely open and this is detected by the associated measuring element (limit switch or position pickup).

Simple functional connection between actual value pickups (measuring element) and adjusting device (simple electric proportional adjustment).

Elimination of the pressure difference $\Delta P_1$ for the actuator with the greatest volume flow requirement.

No problems with oscillations as no direct hydraulic load pressure feed back occurs, but is provided by pressure compensator positions detected by measuring elements and by electric signal reception and evaluation.

Electric damping is easily possible (should it be necessary).

No power loss at the actuator with the highest operating pressure.

When there are no actuator requirements the standby pressure can be reduced to the region of 0 bar.

Little heating in standby operation.

Regulated operation of the pump; hence automatic adaptation to changed desired value-actual value constellations in the valves and in the pump.

The actuator with the greatest load pressure is provided with the volume flow required.

Because of simple, economical construction it is also of interest for equipment, especially building machinery (excavators, etc.) in the lower power groups.

No special load sensing pumps necessary, only an EP pump (electronic-proportional adjustment).

Uniform control response, since peformance curve adjustments are acknowledged and controlled at the valves and at the pumps.

What is claimed is:

1. A control device for a hydrostatic drive comprising at least two actuators connected in parallel to a variable displacement pump whose adjusting device can be acted on as a function of the displacement and/or of the flow pressure, each actuator has associated with it, in a separate hydraulic supply line having at one end a direct hydraulic path to the pump output, a control valve and a preceding displacement controller in the form of a pressure compensator, the controller associated with an electronic regulating device which, depending on a measuring element that detects the opening position of the pressure compensator, controls, by means of an adjusting member associated with the adjusting device, the displacement setting of the pump, increasing it as the opening of at least one of the pressure compensators becomes larger and decreasing it as the opening becomes smaller.

2. A control device according to claim 1, wherein the measuring element comprises a limit switch.

3. A control device according to claim 1, wherein the measuring element comprises a position pickup.

4. A control device according to claim 1, wherein the electronic regulating device controls the adjusting member and thus the displacement of the pump according to a specified opening position, as detected by the measuring element, of the pressure compenstor associated with the actuator with the greatest load pressure.

* * * * *